Patented June 24, 1947

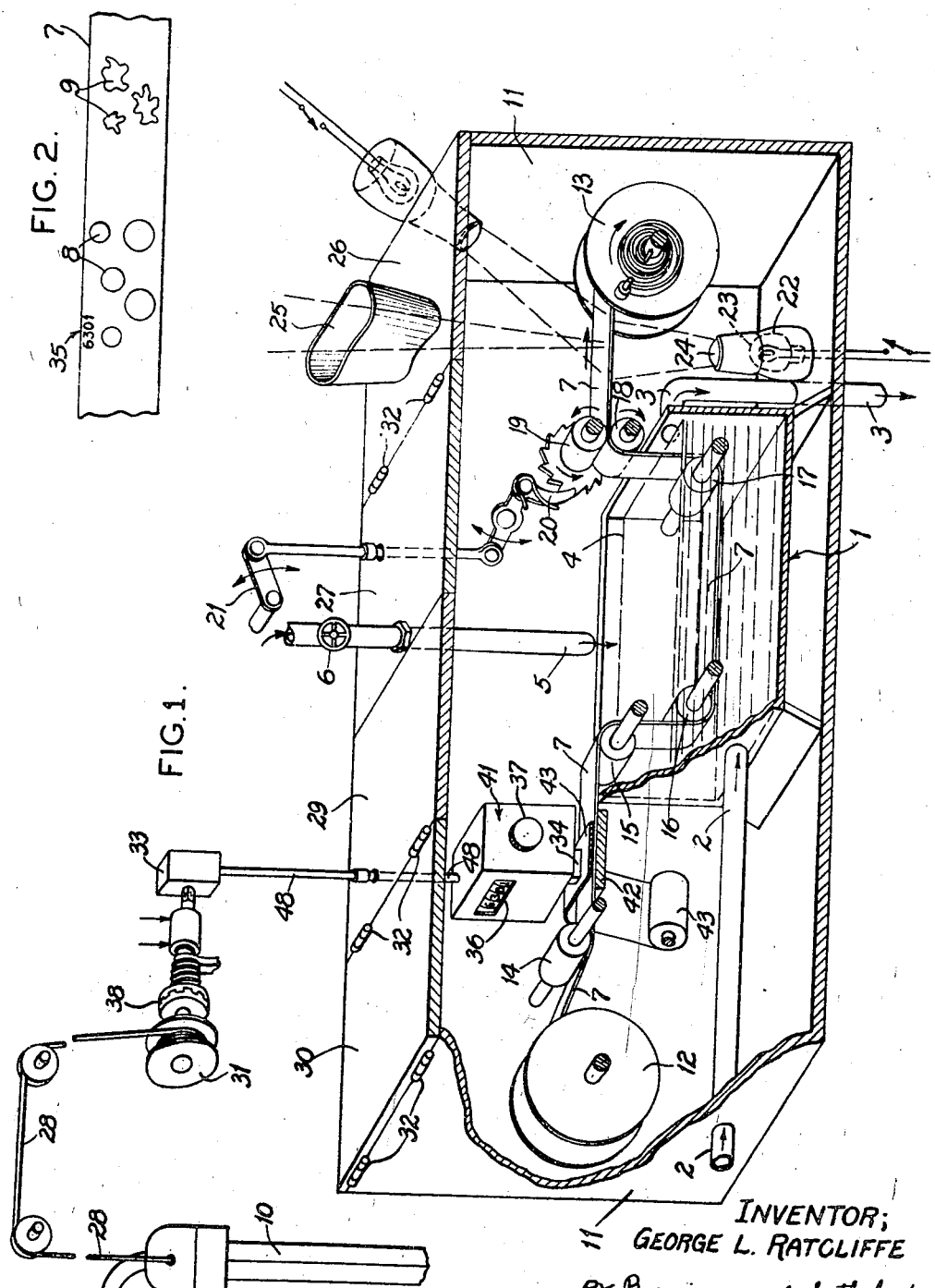

2,422,852

UNITED STATES PATENT OFFICE 2,422,852

PROCESS OF DETECTING OIL DISPERSED IN WELL DRILLING FLUIDS

George L. Ratcliffe, Los Angeles, Calif., assignor to National Lead Company, Los Angeles, Calif., a corporation of New Jersey Application July 11, 1942, Serial No. 450,605

12 Claims. (Cl. 73—153)

This invention relates generally to the detection of oil, particularly in the drilling of an oil well.

In the drilling of an oil well, it is important to determine when the bit reaches an oil bearing stratum; also to determine the depth of such stratum. A process of accomplishing this is described in the Hayward Patent 2,214,674, which describes the detection of oil dispersed in a drilling fluid, during rotary drilling, in connection with the measurement of the depth of the stratum from which the oil was dispersed in the drilling fluid. Various means are described for detecting the presence of oil in the drilling fluid issuing from the well. However, the means described are not as positive as desired and withal they are not automatic.

One of the objects, therefore, is to provide a process whereby the detection of oil may be secured in a more positive and accurate manner.

Another object is to provide a process and apparatus, whereby such detection may be coordinated with the depth of the stratum where the oil originated.

Another object is to provide a process which is automatic in its operation.

Further objects will appear from the detailed description, taken in connection with the accompanying drawing, in which will be described a number of embodiments of this invention. It is to be understood, however, that this invention is susceptible of various embodiments, and that certain features and subcombinations are of utility, and may be employed without reference to other features and subcombinations, within the scope of the appended claims.

In the accompanying drawing, Figure 1 is an elevation, somewhat diagrammatic in form, illustrating an embodiment of this invention. Figure 2 is a face view of the record.

Generally stated, and in accordance with this invention, there is contacted with the fluid, in which the oil is dispersed, a medium or record base, preferentially affected by oil, in order to enable any oil thereon to be detected. This medium or base is one which is preferentially wetted by oil, as distinguished from greases, and may be of a suitable paper or light sensitive medium. The medium is preferably in the form of a record strip on which the presence of oil is indicated, and such record strip may be moved, so that successive parts thereof will be affected by the oil. Coordinated with this medium may be means for marking the depth corresponding to the marking of the medium by the oil, and particularly the depth from which the oil marked on the medium originated. The apparatus may be substantially automatic so as to automatically make a record of oil markings in coordination with depth markings.

Referring to the accompanying drawing, 1 designates a container for the drilling fluid, which may be supplied with such fluid by a conduit or pipe 2 from the well, while 3 is a discharge conduit or pipe, so as to maintain a level of the fluid in the container at 4. A pipe or conduit 5, provided with a valve 6, may supply water or a viscosity reducing agent to the container.

A medium or record base 7, preferably in the form of a strip, is arranged to contact with the drilling fluid in the container, and this medium is of a character so as to be preferentially affected, as by wetting, by oil. A medium which is suitable is ordinary note or bond paper, that is, a sized paper, which is somewhat wettable by water, but readily wettable by petroleum oil. Upon such contacting of the medium with the drilling fluid, any oil in the drilling fluid will show up in the form of round spots 8, Figure 2, of the same hue as the rest of the paper, but presenting an oily appearance as contrasted with the matte surface of the remainder of the paper. On ordinary bond paper it will show up readily if the paper is held up to the light and viewed with transmitted light, because the oil spots will have greater apparent brightness than the remainder of the paper. On the other hand greases will not generally stick to the paper, but those specks of grease which do stick will form spots 9, Figure 2, having irregular outlines as contrasted with the round oil spots. The distinction between the presence of petroleum oil and grease in the drilling fluid can, therefore, be readily detected. In view of the fact that the paper is wetted by the oil, even small globules of oil in the drilling fluid, contacting with the paper, will spread so as to be somewhat enlarged, although still remain round. When viewed under ultra-violet light, the oil will show up in the form of round spots fluorescing yellow, blue or violet, while the rest of the paper will have the usual dull yellowish fluorescence of cellulose. Specks of grease will again simply show up as an irregular outlines.

The oil spots on the record base will be permanent. However, in order to facilitate observation, as well as permanence, the medium may be a light sensitive one, an example of which is ordinary photographically sensitized paper, having again a matte surface, preferentially wettable by oil. When this is contacted with the drilling fluid as by immersion, either before or after exposure of the paper to the light and the paper developed, petroleum oil will show up very distinctly as round spots on a black field under ordinary light, and as fluorescent round spots under ultra-violet light; as distinguished from grease, even if adhering, which will show up as irregular white spots on a black field. Of course, what causes the oil spots to show up eventually is not anything connected with the exposure, but the fact that the developer cannot get to the sensitized gelatin where it has been oiled. In order to secure a permanent record it is necessary to fix the sensitized strip for a long time, preferably with a wetting agent in the fixing bath, so that the undeveloped silver halide in the oil spots will be removed. Otherwise, even the oil spots would eventually darken under prolonged exposure to light.

The term "preferentially wetted by oil," as used herein, does not necessarily imply that the surface of the material is strongly water-repellent like a greased paper, but merely implies that the material has sufficient preferential oil wettability that the oil droplets will adhere to the paper in spite of the presence of water.

It will thus be seen that a record of the presence of oil in a drilling fluid can be readily obtained. Hot water or a viscosity reducing agent, such as a polyphosphate, may be supplied to the drilling fluid through the conduit or pipe 5, so as to permit the oil to more readily attach itself to the record base.

In order to secure an automatic and continuous record, the medium or record base 7 may be placed in an apparatus in which it can be contacted with the drilling fluid, and in case the medium is sensitized paper it should, of course, be covered. The drilling fluid from the top of the well, or a part thereof, will be continuously passed through the container.

Referring to Figure 1, 11 designates a casing in which is mounted the container 1, receiving drilling fluid continuously from the well. The record base is taken from a spool 12 from which it may be unwound on to another spool 13, which may be in the form of the film spools in a camera and removable and replaceable. The record base is passed over rollers 14, 15, 16, 17 and 18, so as to become immersed in the drilling fluid in order to contact therewith. A feed roll 19, operated by a pawl 20 and an oscillating arm 21, operated continuously by a motor or a moving part of the drilling mechanism, may be employed to feed the record base through the apparatus. Light may be projected onto or from beneath the record base, after it has contacted with the drilling fluid, by a suitable lighting means 22 above or below the record base, or both above and below, and provided with a bulb 23 and a lens 24, and this light projected may be either in the form of ordinary light or ultra-violet light. A suitable viewing means 25 may be provided to view the record base so illuminated. The top of the apparatus may be assembled in sections 26, 27, 29 and 30 by means of hinges 32 for access to the interior of the apparatus.

In order to provide for marking of the record base with suitable indications, such as the depth of the well, suitable marking means 41 having type 34, such as number type, may be provided to mark the edge of the record base, as shown at 35 in Figure 2, and one face 36 of the device 41 may be provided with windows through which additional type also shows. A manually operated knob 37 may be connected with this mechanism to set it manually or to set it back. Such mechanism is known in various arts and a detailed description thereof is unnecessary.

In order to enable the device 41 to be operated in accordance with the depth of the well, an apparatus of the character described in the Hayward Patent 2,166,212 may be employed, in which similar parts are indicated by the same reference numerals, the device 41 corresponding to that of the Hayward patent, except that, in this case, it has a number type in addition to indicating designations. The drill stem 10 is connected by a measuring line 28 with a measuring wheel 31, whose shaft is connected by a clutch device 38, with gearing 33, connected by a shaft 48 to the device 41. The structure is such that the movement downward of the drill stem will be communicated to the device 41, so as to set its printing and indicating means in accordance with the depth of the well. By means of the set back device 37, the depth of the well, corresponding with the issuance of the fluid at the top of the well, can be indicated and printed. A suitable support or anvil 42 is provided for the printi43ytngp ,ndeanitg(m2 42 is provided for the printing type 34, and in order to secure such printing a suitable ink ribbon 43 may be traversed cross-wise of the record base 7.

The mechanism described is substantially automatic and provides an automatic record, not only of the presence of oil, but relates it to the depth of the well where the oil originated. The record as finally issued will contain a complete indication of occurrence of oil as related to the depth thereof, and this record may be preserved, and by removal of the roll 13, it can be placed in a suitable record case for future reference.

Having thus described the invention, what is claimed is:

1. The process of detecting oil dispersed in a well-drilling fluid, comprising, contacting the fluid with a medium preferentially affected by oil and subjecting the medium to detection for oil.

2. The process of detecting oil dispersed in a well-drilling fluid, comprising, contacting the fluid with a medium preferentially wetted by oil and subjecting the medium to detection for the wetted part thereof.

3. The process of detecting oil dispersed in a well-drilling fluid, comprising, contacting the fluid with a paper preferentially affected by oil and subjecting the paper to detection.

4. The process of detecting oil dispersed in a well-drilling fluid, comprising, contacting the fluid with a light sensitive medium preferentially affected by oil and developing the medium.

5. The process of detecting oil dispersed in a well-drilling fluid, comprising, contacting the fluid with successive parts of a medium preferentially affected by oil and subjecting such successive parts to detection for oil.

6. The process of detecting oil during drilling of a well by the employment of a drilling fluid, comprising, contacting the drilling fluid from the well with a medium preferentially affected by oil in order to enable any oil thereon to be detected.

7. The process of detecting oil during drilling of a well by the employment of a drilling fluid, comprising, contacting the drilling fluid from the well with successive parts of a medium preferentially affected by oil in order to enable any oil thereon to be detected.

8. The process of detecting oil during drilling of a well by the employment of a drilling fluid, comprising, contacting the drilling fluid from the well with a medium preferentially affected by oil and marking the well depth corresponding to the marking of the medium by the oil.

9. The process of detecting oil during drilling of a well by the employment of a drilling fluid, comprising, contacting the drilling fluid from the well with successive parts of a record base preferentially affected by oil and marking the successive parts of the record base with the well depths corresponding to the marking of the medium by the oil.

10. The process of detecting oil during drilling of a well by the employment of a drilling fluid, comprising, contacting the drilling fluid from the well with a medium preferentially affected by oil and marking on the medium the well depth from which the oil marked on the medium originated.

11. The process of detecting oil during drilling of a well by the employing of a drilling fluid, comprising, contacting the drilling fluid with a record base preferentially affected by oil and automatically marking on the record base the well depth corresponding to the oil marking.

12. The process of detecting oil during drilling of a well by the employment of a drilling fluid, comprising, automatically marking on a record base the occurrence of any oil in the fluid and automatically marking on the record base the well depth corresponding to the oil marking thereon.

GEORGE L. RATCLIFFE.

REFERENCES CITED

The following references are of record in the file of this patent:

UNITED STATES PATENTS

| Number | Name | Date |
|---|---|---|
| 1,438,403 | Scherler | Dec. 12, 1922 |
| 1,850,399 | Jakosky | Mar. 22, 1932 |
| 2,207,281 | Athy et al. | July 9, 1940 |
| 2,197,571 | Millington et al. | Apr. 16, 1940 |
| 2,213,138 | Hayward | Aug. 27, 1940 |
| 2,214,674 | Hayward | Sept. 10, 1940 |